United States Patent
Papasakellariou et al.

(10) Patent No.: US 9,655,091 B2
(45) Date of Patent: *May 16, 2017

(54) TRANSMITTING UPLINK CONTROL INFORMATION OVER A DATA CHANNEL OR OVER A CONTROL CHANNEL

(71) Applicant: Samsung Electronics Co., Ltd., Gyeonggi-do (KR)

(72) Inventors: Aris Papasakellariou, Houston, TX (US); Young-Bum Kim, Seoul (KR); Jianzhong Zhang, Richardson, TX (US); Joon-Young Cho, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/870,954

(22) Filed: Sep. 30, 2015

(65) Prior Publication Data

US 2016/0021653 A1    Jan. 21, 2016

Related U.S. Application Data

(63) Continuation of application No. 14/192,450, filed on Feb. 27, 2014, now Pat. No. 9,408,198, which is a
(Continued)

(51) Int. Cl.
| | | |
|---|---|---|
| *H04W 72/04* | (2009.01) | |
| *H04W 36/38* | (2009.01) | |
| *H04L 5/00* | (2006.01) | |

(52) U.S. Cl.
CPC ....... *H04W 72/0413* (2013.01); *H04L 5/0055* (2013.01); *H04L 5/0057* (2013.01); *H04W 36/385* (2013.01); *H04W 72/0446* (2013.01)

(58) Field of Classification Search
CPC ......... H04W 72/0413; H04W 72/0446; H04W 36/385; H04L 5/0057; H04L 5/0055
(Continued)

(56) References Cited

U.S. PATENT DOCUMENTS

| | | |
|---|---|---|
| 2007/0082620 A1 | 4/2007 | Zhang et al. |
| 2008/0159323 A1 | 7/2008 | Rinne et al. |

(Continued)

FOREIGN PATENT DOCUMENTS

| | | |
|---|---|---|
| CN | 101242384 | 8/2008 |
| JP | 2008-136156 | 6/2008 |

(Continued)

OTHER PUBLICATIONS

Ericsson, "Introducing Missing L1 Parameters into 36.213", R1-083059, 3GPP TSG-RAN Meeting #54, Aug. 18-22, 2008, 21 pages.

(Continued)

*Primary Examiner* — Obaidul Huq
(74) *Attorney, Agent, or Firm* — The Farrell Law Firm, P.C.

(57) ABSTRACT

Methods and apparatus are described for User Equipment (UE) to concurrently transmit Uplink Control Information (UCI) and data information to a Node B. The Node B can configure the UE to transmit UCI together with data information in a Physical Uplink Shared CHannel (PUSCH) or separate from data information in a Physical Uplink Control CHannel (PUCCH). The UE may also determine whether to transmit UCI together with data information in the PUSCH or separate from data information in the PUCCH based on criteria involving a ratio of PUSCH resources for UCI transmission over the total PUSCH resources, a Modulation and Coding Scheme (MCS) for the data information, an absolute power difference between PUCCH and PUSCH
(Continued)

transmissions, whether the PUSCH transmission uses frequency hopping, and/or whether spatial multiplexing is used for the data transmission.

20 Claims, 11 Drawing Sheets

Related U.S. Application Data continuation of application No. 12/697,798, filed on Feb. 1, 2010, now Pat. No. 9,125,191.

(60) Provisional application No. 61/148,653, filed on Jan. 30, 2009.

(58) Field of Classification Search
USPC ....... 370/310, 315, 316, 326, 328, 329, 336, 370/343, 345, 464, 480; 455/403, 422.1
See application file for complete search history.

(56) References Cited

U.S. PATENT DOCUMENTS

| | | |
|---|---|---|
| 2008/0280638 A1 | 11/2008 | Malladi et al. |
| 2008/0310360 A1 | 12/2008 | Heo et al. |
| 2008/0311919 A1 | 12/2008 | Whinnett et al. |
| 2008/0316959 A1 | 12/2008 | Bachl et al. |
| 2009/0197630 A1 | 8/2009 | Ahn et al. |
| 2009/0203383 A1 | 8/2009 | Shen et al. |
| 2009/0207784 A1 | 8/2009 | Lee et al. |
| 2009/0207797 A1* | 8/2009 | Shen .................. H04L 5/0053 370/329 |
| 2009/0316626 A1* | 12/2009 | Lee .................... H04L 1/1607 370/328 |
| 2010/0046480 A1 | 2/2010 | Kawamura et al. |
| 2010/0054203 A1 | 3/2010 | Damnjanovic et al. |
| 2010/0118773 A1 | 5/2010 | Kawamura et al. |
| 2010/0290363 A1 | 11/2010 | Johansson et al. |
| 2010/0296460 A1 | 11/2010 | Akimoto et al. |
| 2011/0243087 A1 | 10/2011 | Ahn et al. |
| 2011/0261776 A1 | 10/2011 | Ahn et al. |
| 2011/0274099 A1 | 11/2011 | Kwon et al. |
| 2012/0093097 A1 | 4/2012 | Che et al. |
| 2012/0120830 A1 | 5/2012 | Aiba et al. |

FOREIGN PATENT DOCUMENTS

| | | |
|---|---|---|
| JP | 2008-236427 | 10/2008 |
| WO | WO 2008/149979 | 12/2008 |
| WO | WO 2008/153081 | 12/2008 |
| WO | WO 2010/082757 | 7/2010 |

OTHER PUBLICATIONS

LG Electronics, "UCI Piggyback onto PUSCH in LTE-Advanced", R1-100218, 3GPP TSG RAN WG1 #59b, Jan. 18-22, 2010, 5 pages.

Qualcomm Incorporated, "UL Power Control for Multicarrier Operation", R1-100677, 3GPP TSG RAN WG1 #59bis, Jan. 18-22, 2010, 5 pages.

European Search Report dated Oct. 17, 2016 issued in counterpart application No. 10736065.3-1854, 7 pages.

Qualcomm Europe, "Support of Concurrent Transmission of PUCCH and PUSCH in LTE-A Uplink", R1-090362, 3GPP TSG RAN WG1 #55bis, Jan. 16, 2009.

LG Electronics, "Some Aspects of PUCCH/PUSCH Transmission over Multiple Component Carriers", R1-090208, 3GPP TSG RAN WG1 #55bis, Jan. 12-16, 2009.

Ericsson, "Text Proposal for TR36.814 on Uplink Transmission Scheme", R1-090544, TSG-RAN WG1 Meeting #55bis, Jan. 12-16, 2009.

* cited by examiner

TRANSMITTING UPLINK CONTROL INFORMATION OVER A DATA CHANNEL OR OVER A CONTROL CHANNEL

PRIORITY

This application is a continuation of, and claims priority under 35 U.S.C. §120 to, U.S. patent application Ser. No. 14/192,450, filed on Feb. 27, 2014, and claimed priority under 35 U.S.C. §120 to U.S. patent application Ser. No. 12/697,798, filed on Feb. 1, 2010, which issued as U.S. Pat. No. 9,125,191 on Sep. 1, 2015, and which claimed priority under 35 U.S.C. §119(e) to U.S. Prov. App. No. 61/148,653, which was filed on Jan. 30, 2009, the contents of all of which are incorporated herein by reference.

BACKGROUND OF THE INVENTION

1. Field of the Invention

The present invention is directed to wireless communication systems and, more particularly, to the transmission of control information in the uplink of a communication system.

2. Description of the Art

A communication system consists of a DownLink (DL) supporting transmissions of signals from a base station (Node B) to User Equipments (UEs), and of an UpLink (UL), supporting transmissions of signals from UEs to the Node B. A UE, also commonly referred to as a terminal or a mobile station, may be fixed or mobile and may be a wireless device, a cellular phone, a personal computer device, etc. A Node B is generally a fixed station and may also be referred to as a Base Transceiver System (BTS), an access point, or some other terminology.

UL signals consist of data signals, carrying the information content, control signals, and Reference Signals (RS), which are also known as pilot signals. The UEs convey UL data signals through a Physical Uplink Shared CHannel (PUSCH). The UL control signals include acknowledgement signals associated with the application of Hybrid Automatic Repeat reQuest (HARQ), Service Request (SR) signals, Channel Quality Indicator (CQI) signals, Precoding Matrix Indicator (PMI) signals, or Rank Indicator (RI) signals. Any combination of HARQ-ACKnowledgement (HARQ-ACK), SR, CQI, PMI, or RI will be referred to as Uplink Control Information (UCI). UCI can be transmitted in a Physical Uplink Control CHannel (PUCCH) or, together with data, in the PUSCH over a Transmission Time Interval (TTI).

A UE transmits an HARQ-ACK signal in response to data packet reception in the DL. Depending on whether the data packet reception is correct or incorrect, the HARQ-ACK signal has an ACK or a NAK value, respectively. The UE transmits an SR signal to request UL resources for signal transmission. The UE transmits a CQI signal to inform the Node B of the DL channel conditions it experiences, enabling the Node B to perform channel-dependent scheduling of DL data packets. The UE transmits PMI/RI signals to inform the Node B how to combine the transmission of a signal to the UE from multiple Node B antennas in accordance with a Multiple-Input Multiple-Output (MIMO) principle. Any of the possible combinations of HARQ-ACK, SR, CQI, PMI, and RI signals may be transmitted by a UE jointly with data information in the PUSCH, or separate from data information in the PUCCH.

A structure for the PUSCH transmission in the UL TTI, which for simplicity is assumed to consist of one sub-frame, is illustrated in FIG. 1. A sub-frame 110 includes two slots. Each slot 120 includes $N_{symb}^{UL}$ symbols used for the transmission of data information, UCI, or RSs. Each symbol 130 further includes a Cyclic Prefix (CP) to mitigate interference due to channel propagation effects. The PUSCH transmission in one slot may be in the same or a different part of the operating BandWidth (BW) as/than the PUSCH transmission in the other slot. Some symbols in each slot can be used for RS transmission 140 to provide channel estimation and to enable coherent demodulation of the received signal. The transmission BW is assumed to consist of frequency resource units, which will be referred to as Physical Resource Blocks (PRBs). Each PRB is further assumed to consist of $N_{sc}^{RB}$ sub-carriers, or Resource Elements (REs). A UE is allocated $M_{PUSCH}$ PRBs 150 for PUSCH transmission for a total of $M_{sc}^{PUSCH}=M_{PUSCH} \cdot N_{sc}^{RB}$ REs for the PUSCH transmission BW. The last symbol of a sub-frame may be used for the transmission of a Sounding Reference Signal (SRS) 160, from one or more UEs, whose primary purpose is to provide a CQI for the UL channel that each of these UEs experiences.

A UE transmitter block diagram for UCI and data transmission in the same PUSCH sub-frame is illustrated in FIG. 2. Coded CQI bits and/or PMI bits 205 and coded data bits 210 are multiplexed in step 220. If HARQ-ACK bits also need to be multiplexed, data bits are punctured to accommodate HARQ-ACK bits in step 230. A Discrete Fourier Transform (DFT) of the combined data bits and UCI bits is then obtained in step 240. The REs corresponding to the assigned transmission BW are selected via sub-carrier mapping in step 250 through the control of localized FDMA in step 255. The Inverse Fast Fourier Transform (IFFT) is performed in step 260. The CP is inserted in step 270 and filtering is applied via time windowing in step 280 to achieve a transmitted signal 290. Additional transmitter circuitry such as a digital-to-analog converter, analog filters, amplifiers, and transmitter antennas are not illustrated. Also, the encoding process for the data bits and the CQI and/or PMI bits, as well as the modulation process for all transmitted bits, are omitted for brevity. The PUSCH signal transmission is assumed to be over clusters of contiguous REs in accordance to the DFT Spread Orthogonal Frequency Multiple Access (DFT-S-OFDMA) method allowing signal transmission over one cluster 295A (also known as Single-Carrier Frequency Division Multiple Access (SC-FDMA)), or over multiple non-contiguous clusters of contiguous BW 295B.

The Node B receiver performs the reverse (complementary) operations of those of the UE transmitter. This is conceptually illustrated in FIG. 3 where the reverse operations of those illustrated in FIG. 2 are performed. After an antenna receives the Radio-Frequency (RF) analog signal and after further processing units (such as filters, amplifiers, frequency down-converters, and analog-to-digital converters) which are not shown for brevity, a digital signal 310 is filtered via time windowing in step 320 and the CP is removed in step 330. Subsequently, the Node B receiver applies a Fast Fourier Transform (FFT) in step 340. The REs used by the UE transmitter are selected via sub-carrier demapping in step 350 under the control of reception bandwidth in step 345. An Inverse DFT (IDFT) is applied in step 360. The HARQ-ACK bits are extracted and respective erasures for the data bits are placed in step 370. Data bits 390 and CQI/PMI bits 395 are de-multiplexed in step 380. Well known Node B receiver functionalities such as channel estimation, demodulation, and decoding are not shown for brevity.

A structure for the PUCCH transmission in one slot of a sub-frame is illustrated in FIG. 4 for HARQ-ACK, SR, or RI transmission, and in FIG. 5 for CQI or PMI transmission. The transmission in the other slot, which may be at a different part of the operating BW for frequency diversity, has the same structure with the possible exception of the last symbol, which may be punctured to accommodate SRS transmission for the PUSCH. The PUCCH transmission for each UCI signal is assumed to be in one PRB.

Referring to FIG. 4, a HARQ-ACK (or SR, or RI) transmission structure 410 includes the transmission of HARQ-ACK signals and RS for enabling coherent demodulation of the HARQ-ACK signals. HARQ-ACK bits 420 modulate 430 a Constant Amplitude Zero Auto-Correlation (CAZAC) sequence 440, for example with BPSK or QPSK modulation, which is then transmitted after performing the IFFT operation, as is subsequently described. Each RS 450 is transmitted through the non-modulated CAZAC sequence.

Referring to FIG. 5, CQI (or PMI) transmission structure 510 includes the transmission of CQI signals and RS. CQI bits 520 again modulate 530 a CAZAC sequence 540, for example using QPSK modulation, which is then transmitted after performing the IFFT operation. Each RS 550 is transmitted through the non-modulated CAZAC sequence.

An example of CAZAC sequences is given by Equation (1) below.

$$c_k(n) = \exp\left[\frac{j2\pi k}{L}\left(n + n\frac{n+1}{2}\right)\right] \quad (1)$$

where L is the length of the CAZAC sequence, n is the index of an element of the sequence n={0, 1, ..., L−1}, and k is the index of the sequence. If L is a prime integer, there are L−1 distinct sequences which are defined as k ranges in {0, 1, ..., L−1}. If the PRBs consist of an even number of REs, such as, for example, $N_{sc}^{RB}$=12, CAZAC sequences with even length can be directly generated through computer search for sequences satisfying the CAZAC properties.

FIG. 6 is a diagram illustrating a UE transmitter structure for a CAZAC sequence that can be used non-modulated as an RS or modulated as an HARQ-ACK signal or CQI signal using BPSK (1 HARQ-ACK bit) or QPSK (2 HARQ-ACK bits or CQI bits). The frequency-domain version of a computer generated CAZAC sequence is used in step 610. The REs corresponding to the assigned PUCCH BW are selected via sub-carrier mapping in step 630 under control of the transmission bandwidth in step 620. An IFFT is performed in step 640, and a CS is applied to the output in step 650 as is subsequently described. The CP is inserted in step 660 and filtering via time windowing is applied in step 670 resulting in transmitted signal 680. Zero padding is assumed to be inserted by the reference UE in REs used for the signal transmission by other UEs and in guard REs (not shown). Moreover, for brevity, additional transmitter circuitry such as digital-to-analog converter, analog filters, amplifiers, and transmitter antennas as they are known in the art, are not shown.

The reverse (complementary) transmitter functions are performed at the Node B receiver for the reception of the CAZAC sequence. This is conceptually illustrated in FIG. 7 where the reverse operations of those in FIG. 6 apply. An antenna receives RF analog signal and after further processing units (such as filters, amplifiers, frequency down-converters, and analog-to-digital converters) a digital received signal 710 is filtered via time windowing in step 720 and the CP is removed in step 730. Subsequently, the CS is restored in step 740, an FFT is applied in step 750. The transmitted REs are selected in step 760 via sub-carrier demapping under control of reception bandwidth in step 765. FIG. 7 also shows the subsequent correlation with the replica of the CAZAC sequence in step 780 by multiplier in step 770. Finally, output 790 is obtained which can then be passed to a channel estimation unit, such as a time-frequency interpolator, for an RS, or can to detect the transmitted information, for the CAZAC sequence modulated by HARQ-ACK information bits or CQI information bits.

Different CSs of the same CAZAC sequence provide orthogonal CAZAC sequences. Therefore, different CSs of the same CAZAC sequence can be allocated to different UEs in the same PRB for their RS, or UCI signal transmission and achieve orthogonal UE multiplexing. This principle is illustrated in FIG. 8. In order for multiple CAZAC sequences 810, 830, 850, 870, respectively generated from multiple CSs 820, 840, 860, 880 of the same CAZAC sequence to be orthogonal, CS value Δ 890 should exceed the channel propagation delay spread D (including a time uncertainty error and filter spillover effects). If $T_S$ is the DFT-S-OFDM symbol duration, the number of such CSs is equal to the mathematical floor of the ratio $T_S/D$.

Orthogonal multiplexing for the HARQ-ACK PUCCH transmission structure can be achieved not only through different CS values of the CAZAC sequence, but also by applying orthogonal covering in the time domain. The HARQ-ACK and RS symbols in each slot are respectively multiplied with a first and a second orthogonal code. However, these multiplexing aspects are not material to the invention and further description is omitted for brevity.

When UCI is transmitted in the PUSCH, some REs that would otherwise be used for data are used for UCI, which usually requires better reception reliability than data. As a result more REs are required to transmit a UCI bit than a data bit. Additionally, UCI may require different reception reliability depending on their type. For example, the target Bit Error Rate (BER) for HARQ-ACK is typically much lower than that of CQI/PMI, since erroneous reception of HARQ-ACK has more detrimental consequences and, due their small number, HARQ-ACK bits are protected through repetition coding while more powerful coding methods can apply to CQI/PMI bits. The number of REs required for UCI transmission in the PUSCH is proportional to the spectral efficiency of the data transmission as determined by the data Modulation and Coding Scheme (MCS). For a certain target data BLock Error Rate (BLER), the MCS depends on the Signal to Interference and Noise Ratio (SINR) the UL signal transmission experiences. As the Node B scheduler may vary the target data BLER, it may configure an offset for the number of REs of each UCI signal in order to avoid having only an exclusive link with the data MCS.

Among the UCI signals, HARQ-ACK signals have the highest reliability requirements and the respective REs are located next to the RS in each slot in order to obtain the most accurate channel estimate for their demodulation. The number of coded symbols Q' for the HARQ-ACK (or RI) transmission in the PUSCH can be determined as set forth in Equation (2).

$$Q' = \min\left(\left\lceil \frac{O \cdot \beta_{offset}^{ACK/NAK}}{Q_m \cdot R} \right\rceil, 4 \cdot M_{sc}^{PUSCH\text{-}current}\right) \quad (2)$$

where O is the number of HARQ-ACK (or RI) bits (for example, 1 or 2), $\beta_{offset}^{ACK/NACK}$ is the offset configured to the UE by the Node B, and $M_{sc}^{PUSCH\text{-}current}$ is the PUSCH BW in the current sub-frame. $Q_m$ and R are respectively the number of bits for data modulation ($Q_m$=2, 4, 6 for QPSK, QAM16, QAM64, respectively) and the data code rate of the initial PUSCH transmission for the same transport block. The link between HARQ-ACK REs and data MCS is through $Q_m \cdot R$. The code rate R is defined as $$R = \left(\sum_{r=0}^{C-1} K_r\right) \Big/ (Q_m \cdot M_{sc}^{PUSCH} \cdot N_{symb}^{PUSCH})$$

where $N_{symb}^{PUSCH}=(2 \cdot N_{symb}^{UL}-1)-N_{SRS}$ with $N_{SRS}=1$ if SRS transmission at least partially overlaps with the PUSCH BW and $N_{SRS}=0$ otherwise. Finally, C is the total number of code blocks and $K_r$ is the number of bits for code block number r. The number of HARQ-ACK (or RI) REs is limited to the ones corresponding to 4 DFT-S-OFDM symbols per sub-frame (2 symbols per slot). A similar expression applies for the number of coded CQI/PMI symbols per sub-frame which is omitted for brevity. The principle of the linkage of the UCI resources to the data MCS and the assigned UCI offset is described above for the HARQ-ACK (or RI) symbols.

There are several reasons for UCI to be in the PUSCH, when it occurs with data in the same sub-frame, and not in the PUCCH. A first reason is that concurrent transmission of data in the PUSCH and UCI in the PUCCH increases the Peak-to-Average Power Ratio (PAPR) or the Cubic Metric (CM) of the combined signal transmission, which then requires higher transmission power in both PUCCH and PUSCH to achieve the same reception reliability as when only one of the PUSCH or PUCCH is transmitted. This increase in power increases interference and may not even be possible for power limited UEs. A second reason is the UCI payload may not be possible to transmit in the PUCCH. For example, for the CQI transmission structure in FIG. 5, only 20 coded CQI symbols can be transmitted per sub-frame and therefore, detailed CQI reports need to be sent through the PUSCH.

While UCI and data transmission in the PUSCH preserves the single-carrier property and avoids increasing the CM of PUSCH transmission, it is not spectrally efficient as PUCCH resources assigned to UCI transmission remain unused. Also, multiplexing UCI in the PUSCH may often result in an excessive number of REs being used for UCI instead of data.

In addition to concurrent transmission of UCI and data, concurrent transmission of various UCI signals may often occur. For example, HARQ-ACK and CQI transmission may need to occur in the same sub-frame in the absence of data transmission from a UE. To preserve the single-carrier property and avoid increasing the CM of concurrent transmissions of HARQ-ACK and CQI signals, multiplexing of the two can be in the same PUCCH. For example, HARQ-ACK transmission can be multiplexed in the PUCCH structure of FIG. 5, which is used for CQI transmission by scaling the second RS in each slot by "−1" if ACK is transmitted, and by "+1" if NAK is transmitted, as is the case in 3$^{rd}$ Generation Partnership Project (3GPP) Long Term Evolution (LTE). However, the PUCCH assigned to HARQ-ACK transmission remains unused and the HARQ-ACK BER may degrade relative to when the HARQ-ACK signal transmission uses its own PUCCH resources.

SUMMARY OF THE INVENTION

The present invention has been made to address at least the above problems and/or disadvantages and to provide at least the advantages described below. Accordingly, an aspect of the present invention provides methods and apparatus for a UE to perform concurrent transmissions to a Node B of Uplink Control Information (UCI) either jointly with data information in a Physical Uplink Shared CHannel (PUSCH) or separate from data information in a Physical Uplink Control CHannel (PUCCH) during the same Transmission Time Interval (TTI).

According to one aspect of the present invention, a method is provided for User Equipment (UE) to transmit Uplink Control Information (UCI) and uplink data to a Node B in a communication system, including: receiving, through Radio Resource Control (RRC) signaling, configuration information representative of simultaneous Physical Uplink Shared CHannel (PUSCH) and Physical Uplink Control CHannel (PUCCH) transmission; receiving downlink data; obtaining the UCI comprising at least one of a Hybrid Automatic Repeat reQuest-ACKnowledgement (HARQ-ACK) and a Channel Quality Indicator (CQI) to be transmitted in a subframe; determining whether at least one PUSCH is transmitted in the subframe; transmitting the uplink data on the at least one PUSCH; and transmitting the UCI either on the at least one PUSCH or on at least one PUCCH based on the configuration information representative of simultaneous PUSCH and PUCCH transmission and based on the determination whether the at least one PUSCH is transmitted in the subframe.

According to another aspect of the present invention, a method is provided for a node B to receive Uplink Control Information (UCI) and uplink data from User Equipment (UE) in a communication system, including: transmitting, through Radio Resource Control (RRC) signaling, configuration information representative of simultaneous Physical Uplink Shared CHannel (PUSCH) and Physical Uplink Control CHannel (PUCCH) transmission in a subframe; transmitting downlink data; receiving the uplink data on at least one PUSCH; and receiving the UCI either on the at least one PUSCH or on at least one PUCCH based on the configuration information representative of simultaneous PUSCH and PUCCH transmission and based on whether the at least one PUSCH is transmitted in the subframe, wherein the UCI comprises at least one of a Hybrid Automatic Repeat reQuest-ACKnowledgement (HARQ-ACK) and a Channel Quality Indicator (CQI) to be transmitted in the subframe.

According to a yet further aspect of the present invention, an apparatus is provided for User Equipment (UE) transmitting Uplink Control Information (UCI) and uplink data to a node B in a communication system, including: a receiver configured to receive, through Radio Resource Control (RRC) signaling, configuration information representative of simultaneous Physical Uplink Shared CHannel (PUSCH) and Physical Uplink Control CHannel (PUCCH) transmission; and a transmitter configured to transmit the uplink data on at least one PUSCH and to transmit the UCI either on the at least one PUSCH or on at least one PUCCH based on the configuration information representative of simultaneous PUSCH and PUCCH transmission and based on whether the at least one PUSCH is transmitted in a subframe, wherein the UCI comprises at least one of a Hybrid Automatic Repeat reQuest-ACKnowledgement (HARQ-ACK) and a Channel Quality Indicator (CQI) to be transmitted in the subframe.

According to a still further aspect of the present invention, an apparatus is provided for a node B receiving Uplink Control Information (UCI) and uplink data from User Equipment (UE) in a communication system, including: a transmitter configured to transmit, through Radio Resource Control (RRC) signaling, configuration information representative of simultaneous Physical Uplink Shared CHannel (PUSCH) and Physical Uplink Control CHannel (PUCCH) transmission in a subframe; and a receiver configured to receive the uplink data on at least one PUSCH and to receive the UCI either on the at least one PUSCH or on at least one PUCCH based on configuration information representative of simultaneous PUSCH and PUCCH transmission and based on whether the at least one PUSCH is transmitted in the subframe, wherein the UCI comprises at least one of a Hybrid Automatic Repeat reQuest-ACKnowledgement (HARQ-ACK) and a Channel Quality Indicator (CQI) to be transmitted in the subframe.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
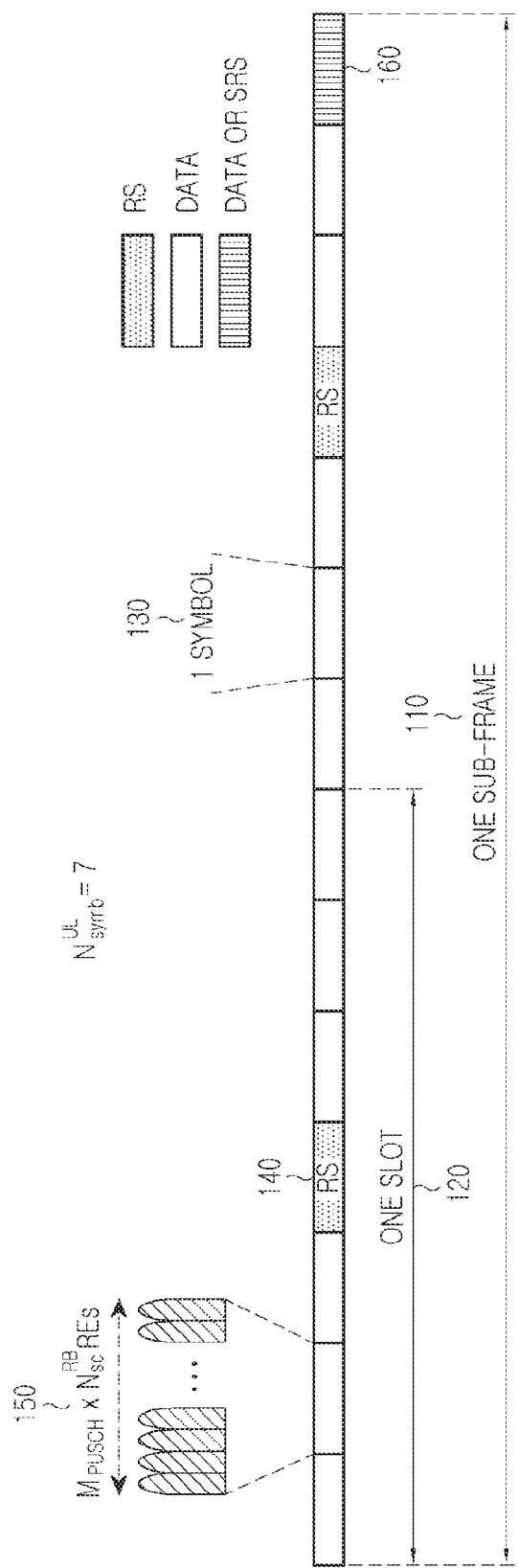
FIG. 1 is a diagram illustrating a sub-frame structure for PUSCH transmission.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

Additionally, although the present invention is described in relation to an Orthogonal Frequency Division Multiple Access (OFDMA) communication system, it also applies to all Frequency Division Multiplexing (FDM) systems in general and to SC-FDMA, Orthogonal Frequency Division Multiplexing (OFDM), Frequency Division Multiple Access (FDMA), DFT-spread OFDM, DFT-spread OFDMA, Single Carrier (SC)-OFDMA, and SC-OFDM in particular.

The embodiments of the present invention first consider rules for deciding when to multiplex UCI with data in the PUSCH and when to transmit UCI and data through separate channels (PUCCH and PUSCH, respectively) in the same sub-frame.

A first embodiment of the present invention considers that the Node B informs each UE, either through UE-specific higher layer signaling (in the Medium Access Control (MAC) layer or in the Radio Resource Control (RRC) layer) or though signaling in the DL control channel (in the Physical layer) providing the scheduling assignment for the PUSCH transmission, whether to perform concurrent transmission in a sub-frame of UCI in the PUCCH and data in the PUSCH. For example, if a UE is power limited, multiplexing UCI in the PUSCH may be preferable as any increase in the CM of the signal transmission due to concurrent PUCCH and PUSCH transmissions will lead to power amplifier back-off and will be damaging to the reception reliability of both PUCCH and PUSCH transmissions. Moreover, the signal transmission in the PUCCH is interference limited, because several UEs multiplex UCI transmissions in the same BW as it was previously described for the HARQ-ACK and CQI transmission structures. Thus, the Node B may choose to configure some UEs to transmit UCI in the PUSCH as a mechanism for reducing PUCCH interference.

Figure 9:
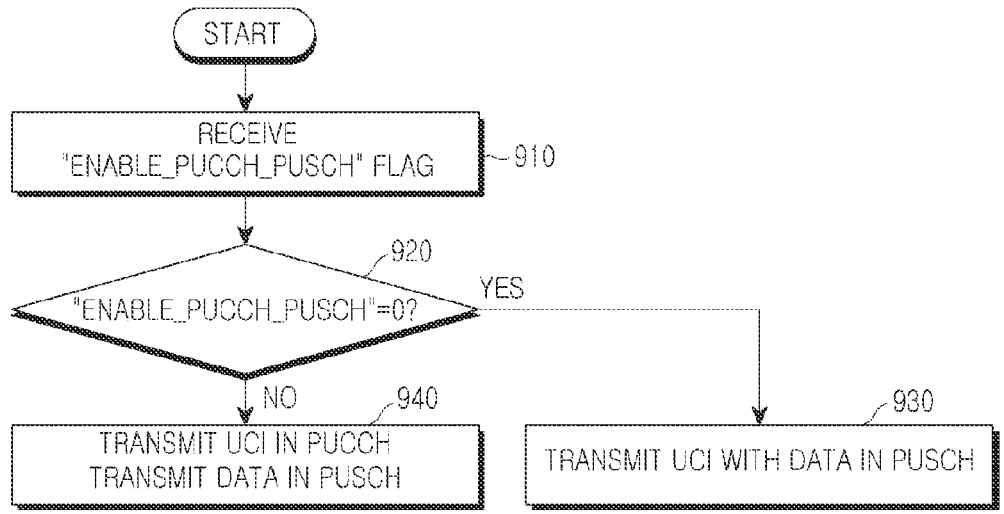
FIG. 9 is a diagram illustrating the enabling or disabling of concurrent PUCCH and PUSCH transmissions from a UE through the use of an "Enable_PUCCH_PUSCH" flag configured to the UE from the Node B, according to an embodiment of the present invention.

FIG. 9 is a diagram that illustrates the concept of enabling or not enabling concurrent PUCCH and PUSCH transmissions from a UE through the use of an "Enable_PUCCH_PUSCH" flag consisting of 1 bit, according to the first embodiment of the present invention. Upon the reception of the "Enable_PUCCH_PUSCH" flag from the Node B in step 910, the UE examines its value in step 920. If the value is zero then, when the UE has data and UCI transmission in the same sub-frame, it transmits UCI in the PUSCH in step 930. Otherwise, it transmits UCI in the PUCCH in step 940.

If the "Enable_PUCCH_PUSCH" flag is set through the DL control channel scheduling the PUSCH transmission then, depending on its value as described in FIG. 9, the UE configures the potential UCI transmission in the PUCCH or in the PUSCH and no further conditions are necessary. However, including one bit in the scheduling assignments for PUSCH transmissions may often be wasteful, for example when the UE has no UCI to transmit, thereby leading to unnecessary control overhead. Setting the "Enable_PUCCH_PUSCH" flag through higher layers (such as the MAC or the RRC) is more efficient but cannot provide dynamic control for UCI inclusion in the PUSCH or its separate transmission in the PUCCH.

A second embodiment of the invention considers the conditions for enabling such dynamic control when the "Enable_PUCCH_PUSCH" flag is set through higher layers (MAC or RRC). When the "Enable_PUCCH_PUSCH" flag is 0, the UE always transmits UCI in the PUSCH when UCI and data transmission occur in the same sub-frame. However, when the "Enable_PUCCH_PUSCH" flag is 1, this may provide a necessary but insufficient condition for the UCI to be transmitted in the PUCCH when the same UE transmits data in the PUSCH in the same sub-frame. One or more of the additional conditions that may need to be fulfilled are subsequently described assuming that the "Enable_PUCCH_PUSCH" flag for the reference UE is set to 1. This allows for, but does not mandate, UCI transmission in the PUCCH while the UE has data transmission in the PUSCH in the same sub-frame.

A first condition for transmitting UCI in the PUCCH while transmitting data in the PUSCH in the same sub-frame is the amount of resources required for UCI transmission in the PUSCH which, based on previous description, can be proportional to the data MCS. Assuming $Q'_{UCI}$ coded symbols are required for UCI in the PUSCH, as previously described in case of HARQ-ACK, the UCI transmission occurs in the PUSCH if the ratio of the UCI resources to the total resources available for data transmission in the reference sub-frame, $G_{UCI} = Q'_{UCI}/(M_{sc}^{PUSCH} \cdot N_{symb}^{PUSCH})$, is smaller than or equal to a predetermined threshold $T_{UCI}$, that is when $G_{UCI} \leq T_{UCI}$ where the UCI signal can be any of the HARQ-ACK, RI, CQI, or PMI signals. Note that as the UCI resources are proportional to the data MCS in the PUSCH, the threshold value may be interpreted as being an MCS value, which may further depend on the UCI type.

For multiple UCI signals, the corresponding ratios and thresholds can be added or a new threshold may be defined. For example, if a UE needs to transmit both HARQ-ACK and CQI in a sub-frame where it also transmits data in the PUSCH, HARQ-ACK and CQI are transmitted in the PUSCH if $G_{HARQ-ACK} + G_{CQI} \leq T_{HARQ-ACK} + T_{CQI}$. Alternatively, by introducing a new threshold, HARQ-ACK and CQI are transmitted in the PUSCH if $G_{HARG-ACK} + G_{CQI} \leq T_{HARQ-ACK\_CQI}$ where $T_{HARQ-ACK\_CQI}$ is the threshold corresponding to both HARQ-ACK and CQI transmission in the PUSCH. This threshold may be different, preferably larger, than $T_{HARQ-ACK} + T_{CQI}$ since by transmitting both CQI and HARQ-ACK in the PUSCH, larger reduction in the PUCCH interference is achieved and a larger increase in the CM is avoided (in case of concurrent signal transmissions). The previous thresholds may have predetermined values applicable to all UEs or they may be signaled to the UEs through higher layer signaling.

Figure 10:
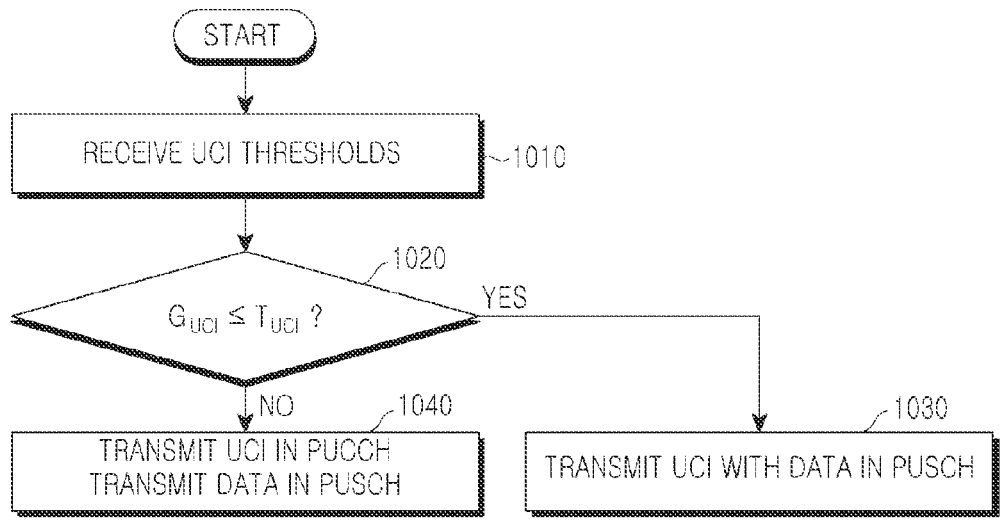
FIG. 10 is a diagram illustrating the comparison by the UE of the ratio of the resources for the transmission of control information in the PUSCH over the total PUSCH resources to a threshold in order to determine whether to transmit control information together with data information if the PUSCH or whether to transmit control information in the PUCCH and data information in the PUSCH during the same sub-frame, according to an embodiment of the present invention.

FIG. 10 is a diagram illustrating the concept of using thresholds for the ratio of UCI resources over the maximum resources available for data transmission in the PUSCH during a reference sub-frame in order to decide whether the UCI transmission should occur in the PUSCH or the PUCCH, according to an embodiment of the present invention. The UE first determines the UCI thresholds in step 1010, which are either included in the system specifications or conveyed to the UE through higher layer signaling. Subsequently, the UE compares the ratio $G_{UCI}$ of the total UCI resources over the total resources available for data transmission in the reference sub-frame to the respective UCI threshold $T_{UCI}$ in step 1020. If $G_{UCI} \leq T_{UCI}$, the UE transmits UCI with data in the PUSCH in step 1030. Otherwise, the UE transmits UCI in the PUCCH in step 1040.

A second condition for transmitting UCI in the PUCCH while transmitting data in the PUSCH, in the same sub-frame, is the difference in the required transmission power. A different transmission power control scheme is assumed to apply for the PUCCH and the PUSCH. The transmission power in the PUCCH in the reference sub-frame based on the power control mechanism applied to PUCCH transmissions is denoted by $P_{PUCCH}$. The transmission power in the PUSCH in the reference sub-frame based on the power control mechanism applied to PUSCH transmissions is denoted by $P_{PSCCH}$. The invention considers that UCI can be transmitted in the PUCCH only if the difference in the two transmission powers is smaller than or equal to a threshold $T_{power}$, that is $|P_{PUCCH} - P_{PUSCH}| \leq T_{power}$. In a second realization, the square root of the PUCCH and PUSCH transmission powers may be considered and then the criterion for UCI transmission in the PUCCH becomes $|\sqrt{P_{PUCCH}} - \sqrt{P_{PUSCH}}| \leq T'_{power}$.

The value for the threshold $T_{power}$ (or $T'_{power}$) may be common to all UEs and either included in the specifications of the communication system or signaled by the Node B through a broadcast channel. It may also be UE-specific and signaled by the Node B through higher layer signaling to the reference UE. Moreover, for concurrent PUCCH and PUSCH transmissions, since the total UE transmission power needs to be kept below a maximum value $P_{max}$ (for a given UE amplifier class), and since the PUCCH is the more critical channel having lower BER requirements and not benefiting from HARQ, the PUCCH transmission power is kept at $P_{PUCCH}$ and the PUSCH transmission power is either $P_{max} - P_{PUCCH}$ if $P_{max} - P_{PUCCH} \leq P_{PUSCH}$, or it is $P_{PUSCH}$ if $P_{max} - P_{PUCCH} > P_{PUSCH}$. It is noted that the Node B is typically aware of the change in the PUSCH transmission power and it can appropriately adjust the MCS of the data in the PUSCH to account for that change.

Figure 11:
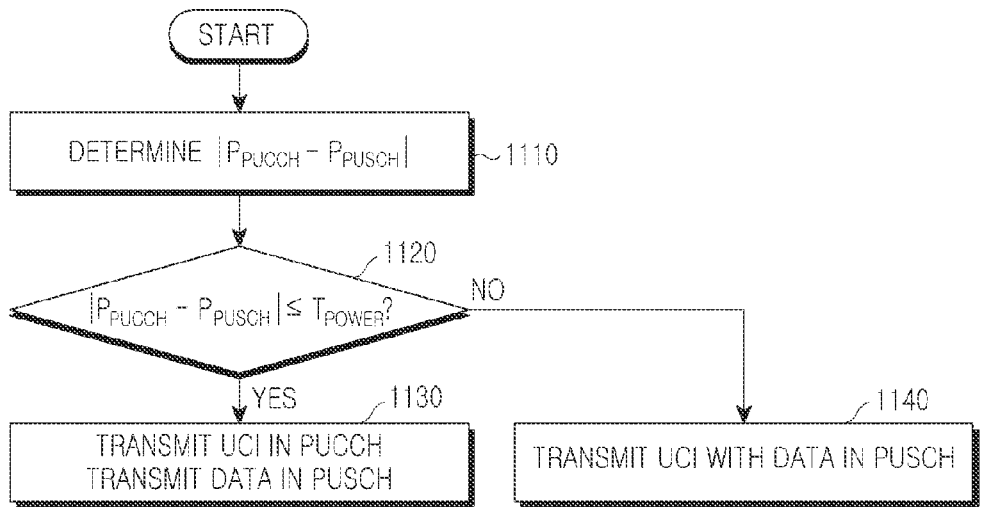
FIG. 11 is a diagram illustrating the comparison by the UE of the absolute difference between the powers for transmission in the PUCCH and the PUSCH to a threshold in order to determine whether to transmit control information together with data information if the PUSCH or whether to transmit control information in the PUCCH and data information in the PUSCH during the same sub-frame, according to an embodiment of the present invention.

FIG. 11 is a diagram that illustrates the concept of using the difference between the transmission powers in a reference sub-frame of the individual PUCCH transmission (in the absence of PUSCH transmission from a UE) and the individual PUSCH transmission (in the absence of PUCCH transmission from the reference UE) to determine whether the UCI is transmitted in the PUCCH or in the PUSCH, according to an embodiment of the present invention. The UE first determines the difference $|P_{PUCCH} - P_{PUSCH}|$ in step 1110 and subsequently compares it to the threshold value $T_{power}$ in step 1120. If $|P_{PUCCH} - P_{PUSCH}| \leq T_{power}$, the UE transmits UCI in the PUCCH in step 1130. Otherwise, the UE transmits UCI in the PUSCH in step 1140.

A third condition for transmitting UCI in the PUCCH, while transmitting data in the PUSCH in the same sub-frame, is the number of different PUCCH transmissions as identified by their corresponding frequency or code (cyclic shift or orthogonal cover) resources. For example, a UE may be receiving DL data packets independently in multiple Component Carriers (CCs) of a communication system. Multiple HARQ-ACK transmissions are required, each corresponding to a codeword of the DL data packet and each possibly requiring a separate respective frequency or code resource. To avoid introducing PUCCH interference from multiple HARQ-ACK transmissions and avoid increasing the CM of the signal transmission and the associated overhead from RS transmission, the HARQ-ACK transmission can be in the PUSCH. Therefore, the number of separate PUCCH resources required for UCI transmission can be another parameter in determining whether UCI transmission is in the PUCCH or in the PUSCH.

If $Q'_{ACK/NAK}$ coded symbols are required for HARQ-ACK transmission associated with one HARQ process and if $Q_{ACK/NAK}^n$ coded symbols are required for HARQ-ACK transmission associated with M HARQ processes, the HARQ-ACK transmission is in the PUSCH if $\tilde{G}_{ACK/NAK} = Q_{ACK/NAK}^n / (M_{sc}^{PUSCH} \cdot N_{symb}^{PUSCH}) \leq w_M \cdot T_{ACK/NAK}$, where $w_M$ is a scaling factor with value depending on M, with $w_1=1$ for M=1 and $w_{M-1} < w_M$ for M>1. For example, if $Q''_{ACK/NAK} = M \cdot Q'_{ACK/NAK}$, then $w_M > M$ in order to favorably bias HARQ-ACK transmission in the PUSCH in case multiple HARQ-ACK channels, as determined by frequency or code resources, are required for HARQ-ACK transmission in the PUCCH. The same arguments can be extended in a straightforward manner for UCI signals other than HARQ-ACK.

A fourth condition for transmitting UCI in the PUSCH, while transmitting data in the PUSCH in the same sub-frame, is whether the PRBs of PUSCH transmission are the same in both slots (localized transmission as opposed to transmission using frequency hopping). Localized PUSCH transmission is typically the result of the Node B scheduler being able to select PRBs where the signal transmission from the UE experiences a high SINR. Conversely, the PRBs where PUCCH transmission can occur are typically predetermined and Frequency Hopping (FH) is applied for the transmission in two slots to improve frequency diversity. Therefore, UCI transmission can occur in the PUSCH if the transmission of the latter is localized (FH is not used), even though the potentially high SINR of such PUSCH transmission is expected to be captured in the data MCS. Therefore, the fourth condition is already to some extent captured by the first condition.

Figure 2:
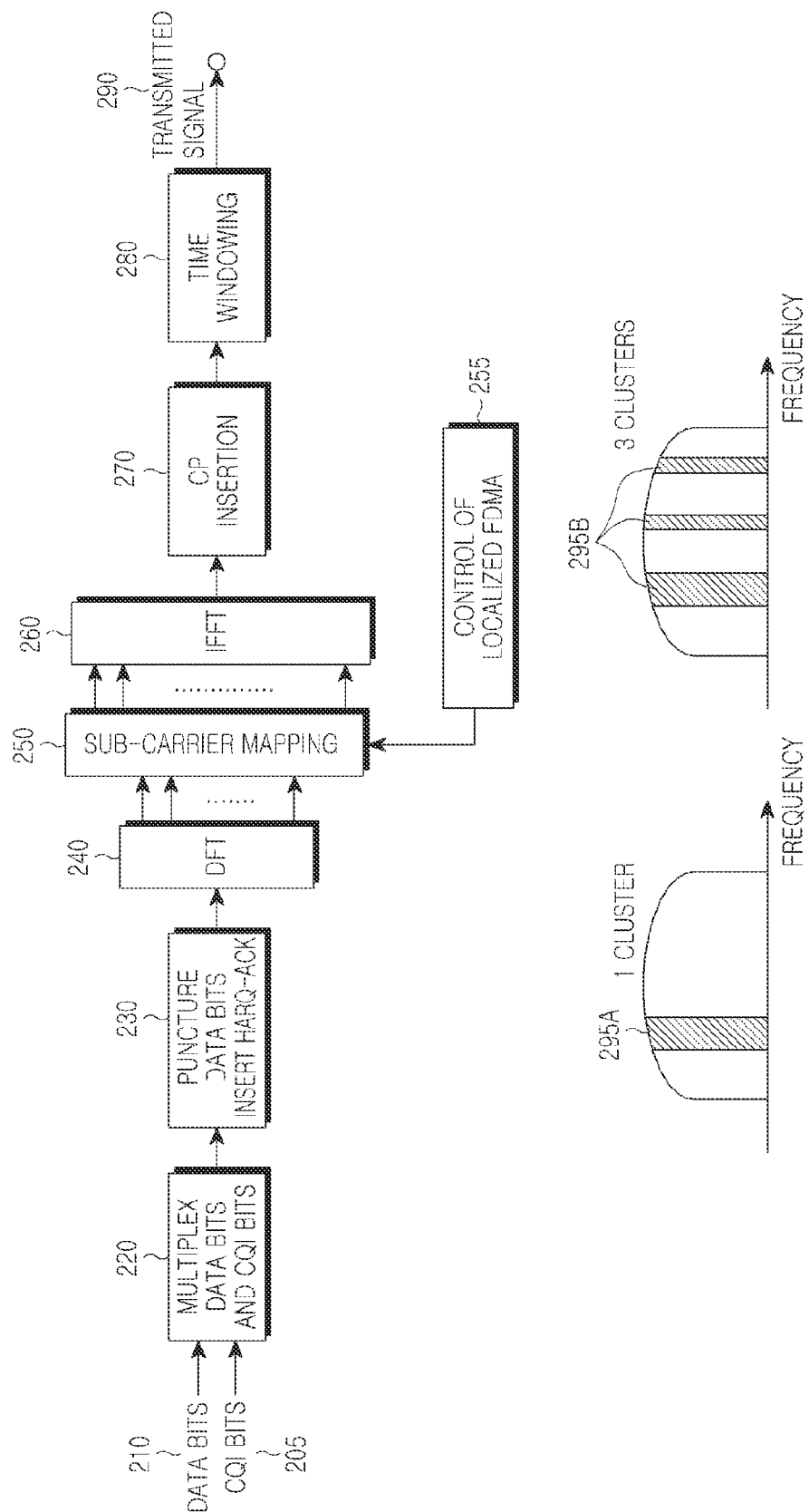
FIG. 2 is a block diagram illustrating a transmitter structure for the transmission of data information and control information in the PUSCH.
Figure 3:
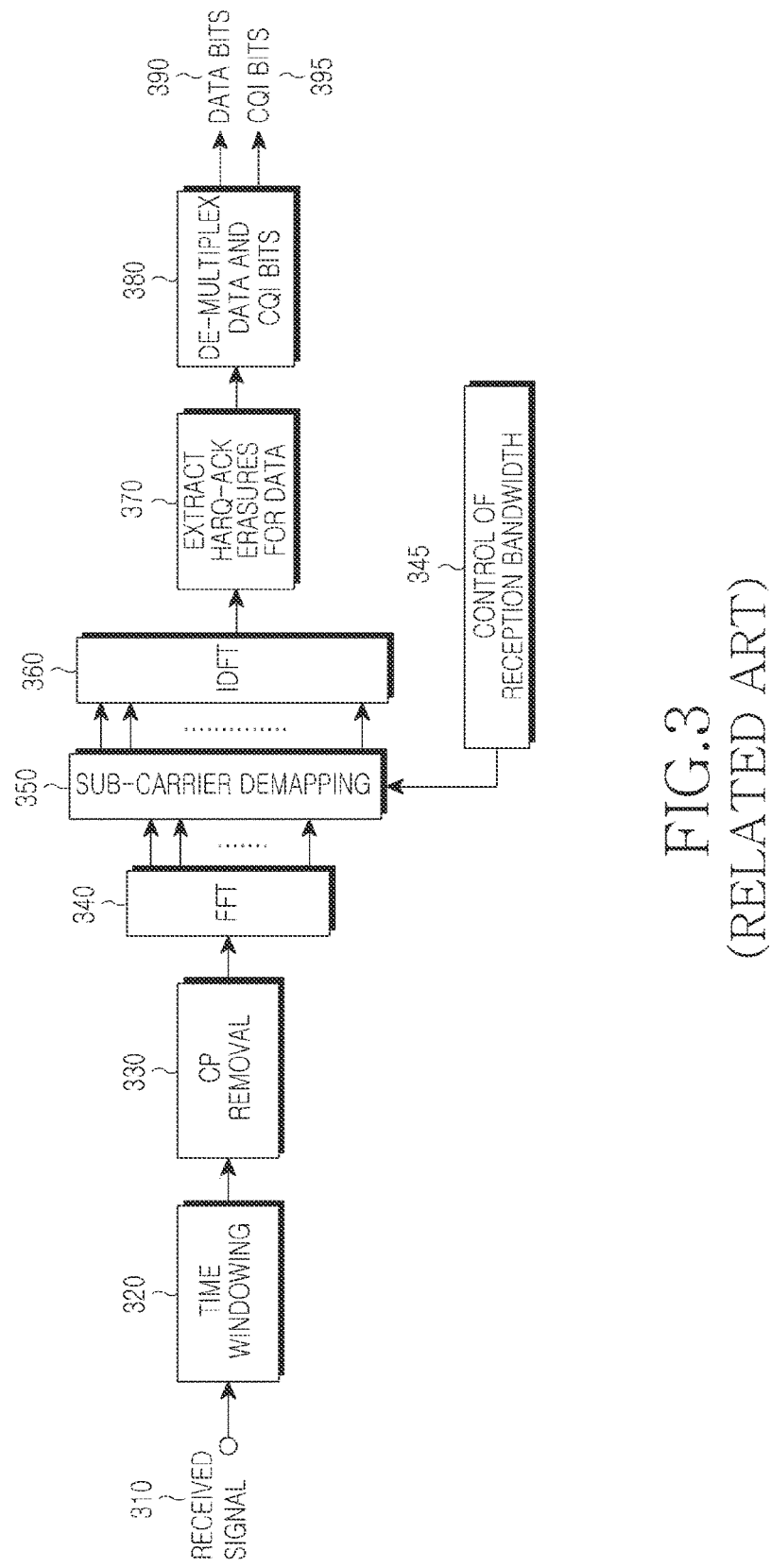
FIG. 3 is a block diagram illustrating a receiver structure for the reception of data information and control information in the PUSCH.

A fifth condition for transmitting UCI in the PUSCH, while transmitting data in the PUSCH in the same sub-frame, is whether the data transmission uses the MIMO principle for spatial multiplexing of data streams in case the UE has multiple transmitter antennas. Because UCI and data multiplexing occurs prior to the DFT in FIG. 2, the UCI transmission will always experience interference regardless of the MIMO layers used for UCI transmission. Since the UCI reception reliability will then depend on the MIMO receiver used by the Node B for data and since the UCI error requirements are typically significantly different than the data error requirements, the process of determining the UCI resources in the PUSCH in case MIMO as applied to the data transmission can become complex. To avoid such complexity and ensure the reliability of UCI reception regardless of the Node B receiver for MIMO, the UCI transmission may always be in the PUCCH when the data transmission in the PUSCH uses spatial multiplexing, particularly since such a UE is typically not power limited. If the data transmission does not use spatial multiplexing of data streams (although it can use transmitter antenna diversity), the UE may transmit the UCI together with data in the PUSCH, or it may examine additional conditions, as they were previously described, about whether the UCI transmission should be together with data transmission in the PUSCH or, separate from data transmission, in the PUCCH.

Figure 12:
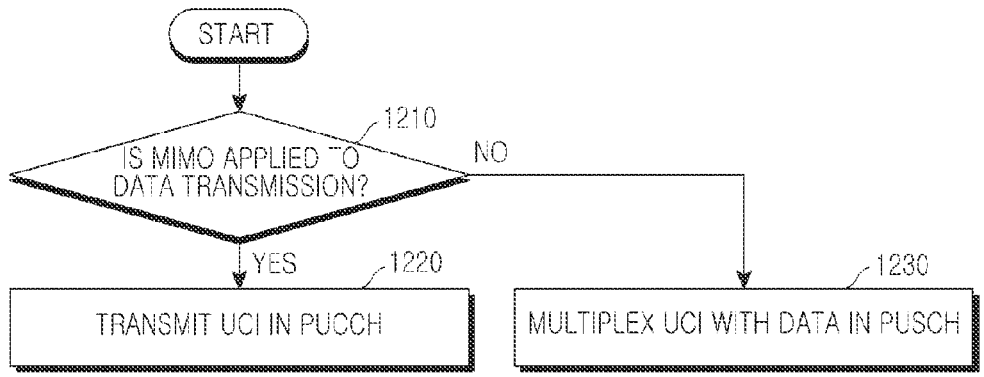
FIG. 12 is a diagram illustrating the decision by the UE to transmit control information in the PUCCH depending on whether the data transmission in the PUSCH uses the MIMO transmission method, according to an embodiment of the present invention.

FIG. 12 is a diagram illustrating the concept of determining the channel (PUCCH or PUSCH) for UCI transmission based on whether or not MIMO for spatial multiplexing of data streams is applied to the data transmission in the PUSCH, according to an embodiment of the present invention. If is determined that MIMO is applied to the data transmission in step 1210, UCI is transmitted in the PUCCH in step 1220; otherwise, UCI is transmitted in the PUSCH in step 1230.

Embodiments of the present invention now consider rules for deciding, in the absence of PUSCH transmission in a reference sub-frame, whether to multiplex UCI signals of different types in one PUCCH resource or whether to use multiple PUCCH resources, one for each UCI signal. An embodiment of the present invention considers the transmission in the same sub-frame of two UCI signals where the first is an HARQ-ACK signal and the second is a CQI signal.

Figure 4:
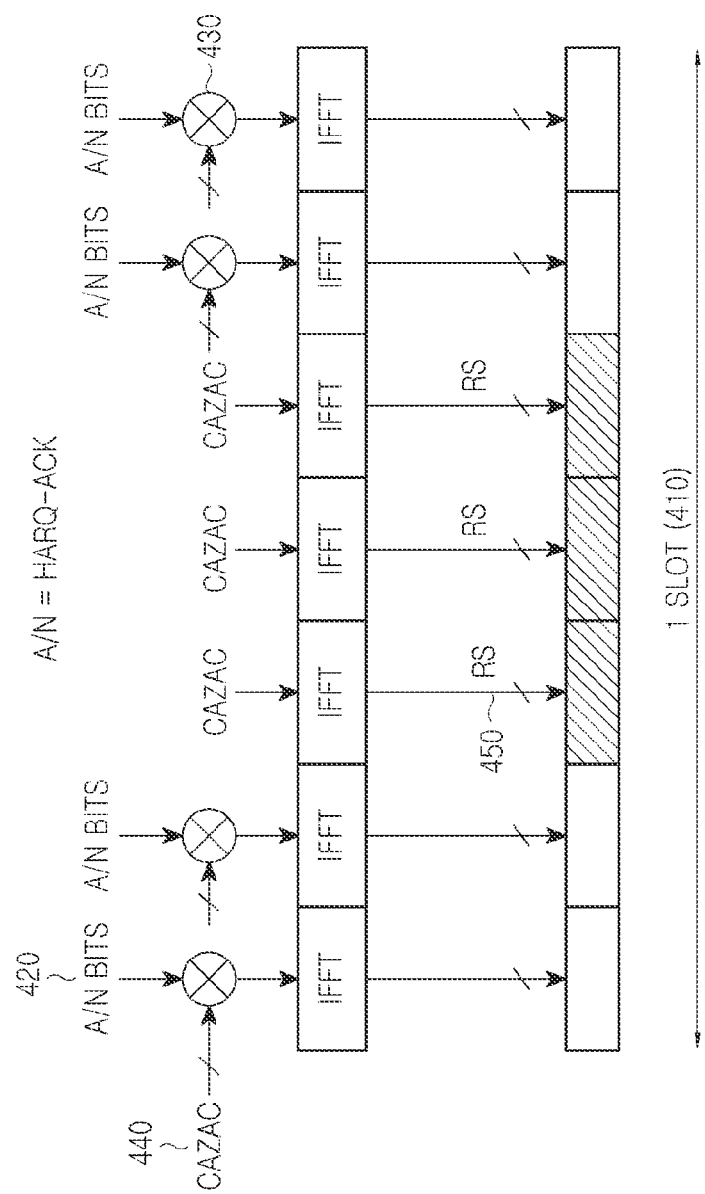
FIG. 4 is a block diagram illustrating a sub-frame structure for HARQ-ACK transmission in the PUCCH.
Figure 5:
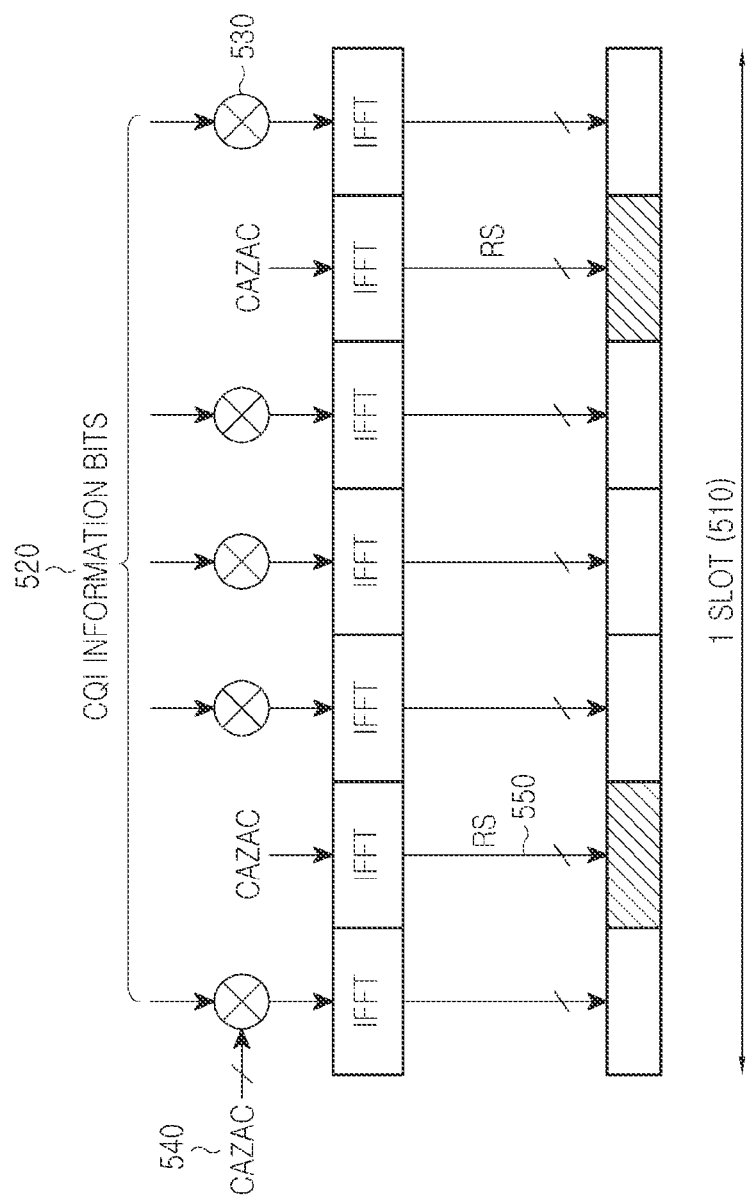
FIG. 5 is a block diagram illustrating a sub-frame structure for CQI transmission in the PUCCH.
Figure 6:
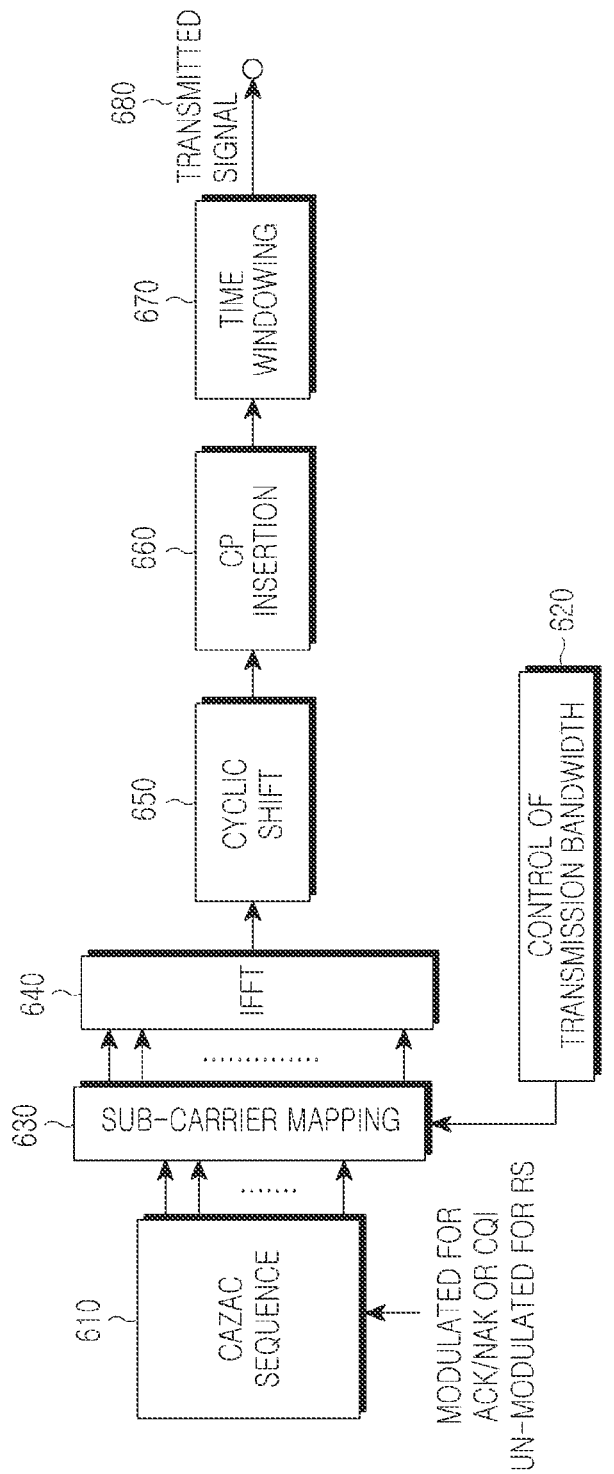
FIG. 6 is a block diagram illustrating a transmitter structure for a CAZAC sequence.
Figure 7:
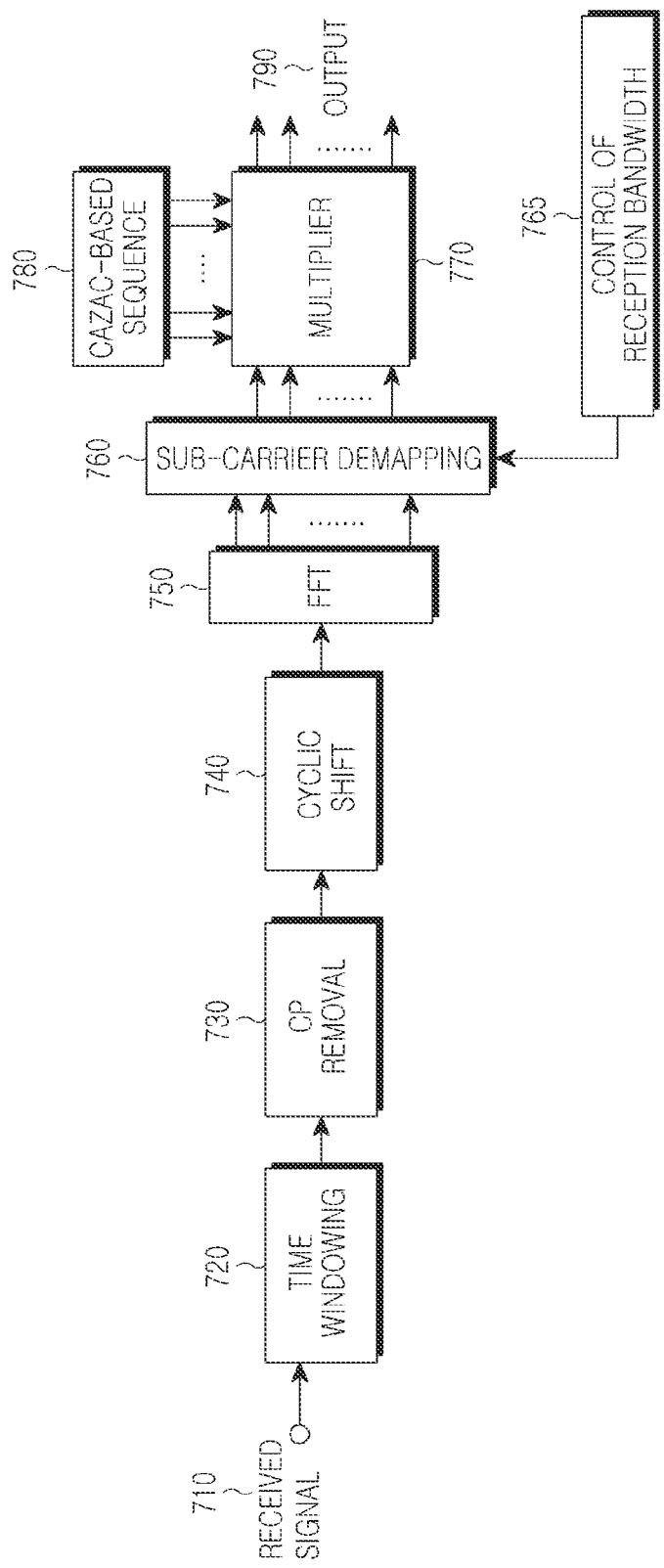
FIG. 7 is a block diagram illustrating a receiver structure for a CAZAC sequence.
Figure 8:
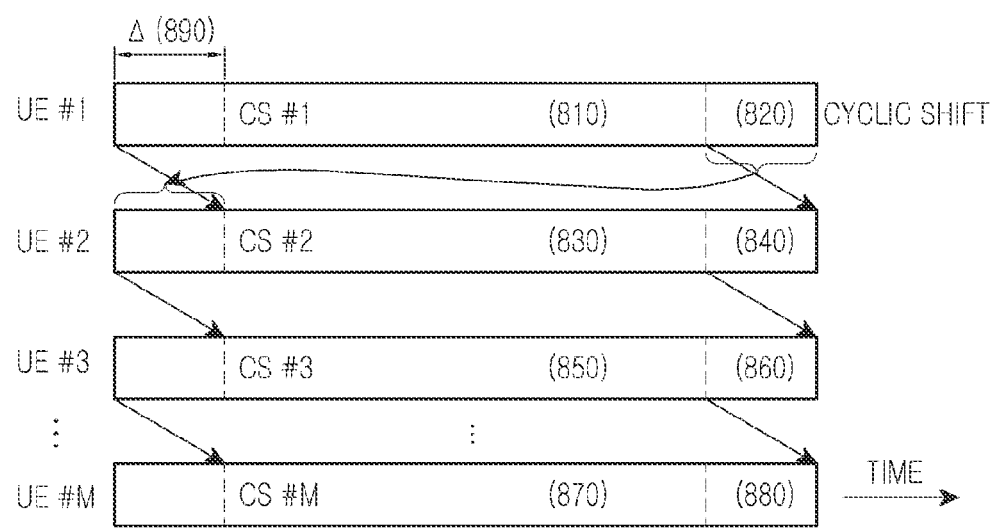
FIG. 8 is a diagram illustrating a multiplexing of CAZAC sequences through the application of different cyclic shifts.

The HARQ-ACK and CQI transmission structures were described in FIG. 4 and FIG. 5, respectively. Multiplexing HARQ-ACK and CQI transmissions can be achieved by using the structure in FIG. 5 and scaling the second RS (with "−1" for ACK and with "+1" for NAK) in each slot, as was previously described. Although this HARQ-ACK and CQI multiplexing typically has negligible impact on the CQI BLER, it can lead to substantial degradation in the HARQ-ACK BER. As a consequence, UEs operating in low SINRs may fail to meet the HARQ-ACK BER targets and it is then preferable for the HARQ-ACK to be transmitted using its own PUCCH resources. This is despite the CM increase, which penalizes the HARQ-ACK and CQI reception reliability less that the HARQ-ACK and CQI multiplexing, especially for the HARQ-ACK.

Figure 13:
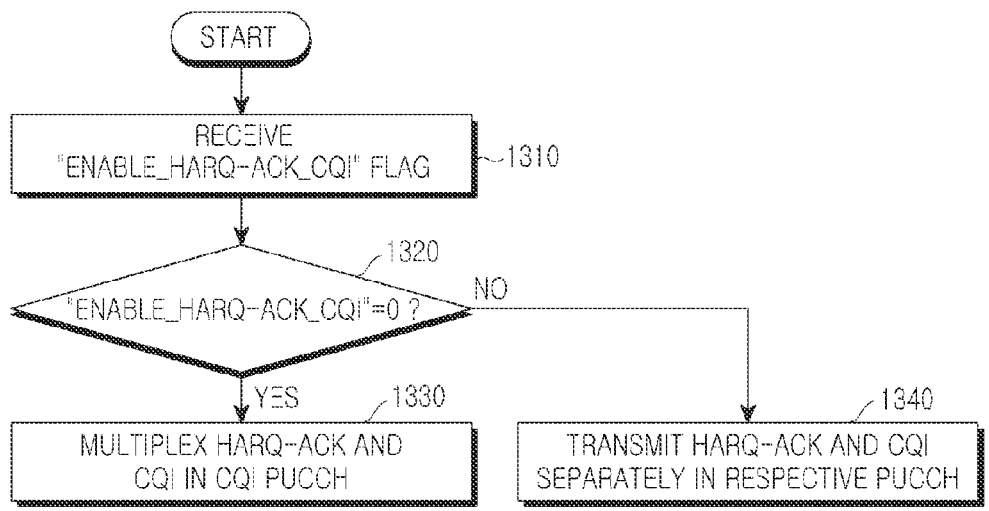
FIG. 13 is a diagram illustrating the enabling or disabling of concurrent transmissions from a UE of HARQ-ACK and CQI control information in the PUCCH through the use of an "Enable_HARQ-ACK_CQI" flag configured to the UE from the Node B, according to an embodiment of the present invention.

Embodiments of the present invention assume that the Node B configures a UE through higher layer signaling (MAC or RRC) whether the HARQ-ACK and CQI transmissions are multiplexed, whenever they happen to occur in the same sub-frame, in one PUCCH, or whether a separate PUCCH is used for the transmission of each signal as when it occurs in the absence of the other. FIG. 13 is a diagram illustrating the concept of enabling or not enabling concurrent HARQ-ACK and CQI transmissions from a UE using separate channels in the PUCCH through the use of an "Enable_HARQ-ACK__CQI" flag, according to an embodiment of the present invention. This is analogous to the concurrent PUCCH and PUSCH transmission described in FIG. 9. Upon the reception of the "Enable_HARQ-ACK_CQI" flag in step 1310, the UE examines its value in step 1320. If it is zero then, when the UE has HARQ-ACK and CQI transmission in the same sub-frame, it multiplexes the two signals in step 1330 using the CQI transmission structure. Otherwise, it transmits HARQ-ACK and CQI using the individual PUCCH for each signal in step 1340.

Figure 14:
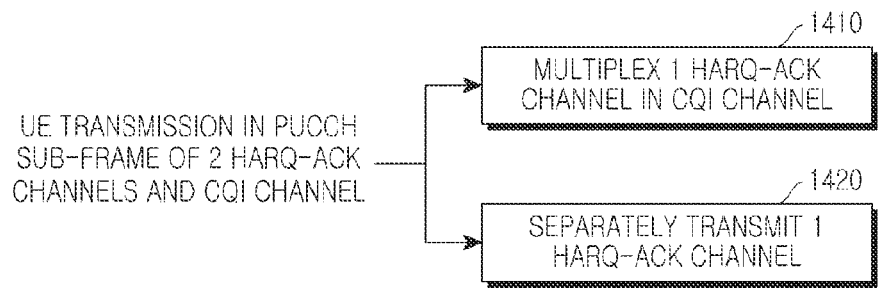
FIG. 14 is a diagram illustrating the simultaneous transmission of 2 HARQ-ACK bits multiplexed in the CQI transmission structure in the PUCCH and the transmission of other HARQ-ACK bits using the HARQ-ACK transmission structure in the PUCCH, according to an embodiment of the present invention.

Another case requiring at least partially separate transmission of HARQ-ACK and CQI signals in the PUCCH occurs when the UE has transmission of more than 2 HARQ-ACK bits in a sub-frame. Embodiments of the present invention assume that HARQ-ACK from only a single HARQ process for a maximum of 2 codewords is multiplexed in the CQI transmission structure of FIG. 5, as in 3GPP LTE. This is because of a limitation in the existing dimensions of the CQI transmission structure in which several HARQ-ACK bits are multiplexed without incurring significant performance losses. Therefore, a number of HARQ-ACK bits equal to the number of CQI channels in the same sub-frame can be multiplexed with the CQI signal transmission using the structure of FIG. 5, while the remaining HARQ-ACK bits are transmitted using their individual PUCCH resources and the transmission structure of FIG. 4. This principle is illustrated in the diagram of FIG. 14, according to an embodiment of the present invention. In a reference sub-frame, 2 HARQ-ACK bits are multiplexed with 1 CQI channel in step 1410 using the structure of FIG. 5, as in 3GPP LTE. 1 HARQ-ACK channel is individually transmitted in step 1420 using the structure of FIG. 4.

Some of the conditions applied for the concurrent PUCCH and PUSCH transmission can be extended to the case of multiple concurrent PUCCH transmissions. For example, the second condition concerning the power difference among the concurrent transmissions may apply for multiple concurrent PUCCH transmissions.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A method for transmitting uplink control information (UCI) by a terminal in a wireless communication system, the method comprising:
   identifying information for simultaneously transmitting physical uplink control channel (PUCCH) and physical uplink shared channel (PUSCH);
   transmitting first UCI on a PUCCH; and
   transmitting second UCI on a PUSCH,
   wherein the first UCI comprises at least one of a hybrid automatic repeat request-acknowledgement (HARQ-ACK) and a service request (SR), and the second UCI comprises a channel quality indicator (CQI).

2. The method of claim 1, wherein the information for simultaneously transmitting indicates that a simultaneous transmission of the PUCCH and PUSCH is configured.

3. The method of claim 1, wherein the first UCI and the second UCI are transmitted in a subframe.

4. The method of claim 1, wherein the information for simultaneously transmitting has a binary value.

5. The method of claim 1, wherein the information for simultaneously transmitting is transmitted through radio resource control (RRC) layer signaling.

6. A terminal apparatus for transmitting uplink control information (UCI) in a wireless communication system, the apparatus comprising:
   a transceiver configured to transmit and receive a signal; and
   a controller configured to identify information for simultaneously transmitting physical uplink control channel (PUCCH) and physical uplink shared channel (PUSCH), to transmit first UCI on a PUCCH, and to transmit second UCI on a PUSCH,
   wherein the first UCI comprises at least one of a hybrid automatic repeat request-acknowledgement (HARQ-ACK) and a service request (SR), and the second UCI comprises a channel quality indicator (CQI).

7. The apparatus of claim 6, wherein the information for simultaneously transmitting indicates that a simultaneous transmission of the PUCCH and PUSCH is configured.

8. The apparatus of claim 6, wherein the first UCI and the second UCI are transmitted in a subframe.

9. The apparatus of claim 6, wherein the information for simultaneously transmitting has a binary value.

10. The apparatus of claim 6, wherein the information for simultaneously transmitting is transmitted through radio resource control (RRC) layer signaling.

11. A method for a base station to receive uplink control information (UCI) from a terminal in a wireless communication system, the method comprising:
    transmitting information for simultaneously transmitting physical uplink control channel (PUCCH) and physical uplink shared channel (PUSCH);
    receiving first UCI on a PUCCH; and
    receiving second UCI on a PUSCH,
    wherein the first UCI comprises at least one of a hybrid automatic repeat request-acknowledgement (HARQ-ACK) and a service request (SR), and the second UCI comprises a channel quality indicator (CQI).

12. The method of claim 11, wherein the information for simultaneously transmitting indicates that a simultaneous transmission of the PUCCH and PUSCH is configured.

13. The method of claim 11, wherein the first UCI and the second UCI are received in a subframe.

14. The method of claim 11, wherein the information for simultaneously transmitting has a binary value.

15. The method of claim 11, wherein the information for simultaneously transmitting is transmitted through radio resource control (RRC) layer signaling.

16. A base station apparatus for receiving uplink control information (UCI) from a terminal in a wireless communication system, comprising:
    a transceiver configured to transmit and receive a signal; and
    a controller configured to transmit information for simultaneously transmitting physical uplink control channel (PUCCH) and physical uplink shared channel (PUSCH), to receive first UCI on a PUCCH, and to receive second UCI on a PUSCH,
    wherein the first UCI comprises at least one of a hybrid automatic repeat request-acknowledgement (HARQ-ACK) and a service request (SR), and the second UCI comprises a channel quality indicator (CQI).

17. The apparatus of claim 16, wherein the information for simultaneously transmitting indicates that a simultaneous transmission of the PUCCH and PUSCH is configured.

18. The apparatus of claim 16, wherein the first UCI and the second UCI are received in a subframe.

19. The apparatus of claim 16, wherein the information for simultaneously transmitting has a binary value.

20. The apparatus of claim 16, wherein the information for simultaneously transmitting is transmitted through radio resource control (RRC) layer signaling.

* * * * *